(12) United States Patent
Pu et al.

(10) Patent No.: US 12,442,562 B1
(45) Date of Patent: Oct. 14, 2025

(54) CONTROL METHOD AND APPARATUS FOR ENERGY STORAGE HEAT EXCHANGE ELECTRIC WATER HEATER

(71) Applicant: Guangdong Macro Gas Appliance Co., Ltd, Foshan (CN)

(72) Inventors: Juncheng Pu, Foshan (CN); Weiwei Tang, Foshan (CN); Haichuan Ma, Foshan (CN); Shaohai Zhong, Foshan (CN)

(73) Assignee: Guangdong Macro Gas Appliance Co., Ltd, Guangdong (CN)

( * ) Notice: Subject to any disclaimer, the term of this patent is extended or adjusted under 35 U.S.C. 154(b) by 0 days.

(21) Appl. No.: 19/260,281

(22) Filed: Jul. 4, 2025

(30) Foreign Application Priority Data

Nov. 1, 2024 (CN) .......................... 202411547034.2

(51) Int. Cl.
*F24H 15/37* (2022.01)
*F24H 1/12* (2022.01)
(Continued)

(52) U.S. Cl.
CPC .............. *F24H 15/37* (2022.01); *F24H 1/122* (2013.01); *F24H 7/002* (2013.01); *F24H 15/219* (2022.01);
(Continued)

(58) Field of Classification Search
None
See application file for complete search history.

(56) References Cited

U.S. PATENT DOCUMENTS 2,604,265 A * 7/1952 Thomas ................. F24H 1/207
236/101 E
3,066,214 A * 11/1962 Arnold .................... F24H 1/202
219/486
(Continued)

FOREIGN PATENT DOCUMENTS

CN 108278778 A 7/2018
CN 110118442 A 8/2019
(Continued)

OTHER PUBLICATIONS

The first search report of counterpart CN application No. 2024115470342 issued on Dec. 5, 2024.

*Primary Examiner* — Thor S Campbell
(74) *Attorney, Agent, or Firm* — The Sun IP Law (57) ABSTRACT

The disclosure provides a control method and apparatus for an energy storage heat exchange electric water heater. The energy storage heat exchange electric water heater includes a water tank, an energy storage electric heater, a heat exchanger, a flow-through electric heater and a thermostatic valve, the flow-through electric heater and the thermostatic valve are controlled to be in an activated operating state at the same time, thus the thermostatic valve is able to mix cold water with hot water outputted from the heat exchanger and then allow mixed water to flow through the flow-through electric heater for being heated. The flow-through electric heater is able to directly heat the mixed water outputted from the thermostatic valve, without heating cold water in the thermostatic valve. Therefore, the temperature of water outputted after the flow-through electric heater heats the mixed water is able to reach the second preset temperature value quickly.

8 Claims, 3 Drawing Sheets

(51) Int. Cl.
*F24H 7/00* (2022.01)
*F24H 15/219* (2022.01)
*F24H 15/238* (2022.01)
*F24H 15/25* (2022.01)
*F24H 15/315* (2022.01)

(52) U.S. Cl.
CPC ............ *F24H 15/238* (2022.01); *F24H 15/25* (2022.01); *F24H 15/315* (2022.01)

(56) References Cited

U.S. PATENT DOCUMENTS

| | | | | |
|---|---|---|---|---|
| 3,958,555 A * | 5/1976 | Horne | ............... | E03C 1/041 122/13.3 |
| 4,282,421 A * | 8/1981 | Hadar | ............... | F24H 1/202 392/452 |
| 4,514,617 A * | 4/1985 | Amit | ............... | F24H 1/202 122/18.4 |
| 4,535,931 A * | 8/1985 | Bartok | ............... | G05D 23/1931 122/14.2 |
| 4,543,468 A * | 9/1985 | Shaffer, Jr. | ............... | F24D 19/1054 62/238.7 |
| 4,604,515 A * | 8/1986 | Davidson | ............... | F24H 15/37 219/486 |
| 4,638,147 A * | 1/1987 | Dytch | ............... | F24H 15/128 219/486 |
| 4,977,885 A * | 12/1990 | Herweyer | ............... | F24D 17/00 122/14.31 |
| 5,056,712 A * | 10/1991 | Enck | ............... | G05D 23/1904 236/47 |
| 5,067,170 A * | 11/1991 | Nagashima | ............... | F24H 15/335 392/458 |
| 5,323,803 A * | 6/1994 | Blumenauer | ............... | F24D 17/00 122/13.3 |
| 5,626,287 A * | 5/1997 | Krause | ............... | F24H 15/414 122/13.3 |
| 5,701,387 A * | 12/1997 | McGugan | ............... | F24D 17/0073 122/13.3 |
| 5,808,277 A * | 9/1998 | Dosani | ............... | F24H 15/225 219/486 |
| 5,838,879 A * | 11/1998 | Harris | ............... | F24H 7/0433 126/344 |
| 6,024,290 A * | 2/2000 | Dosani | ............... | F24H 15/215 236/12.12 |
| 6,173,118 B1 * | 1/2001 | Harris | ............... | F24H 7/0433 126/344 |
| 6,198,879 B1 * | 3/2001 | Harris | ............... | F24H 7/0433 392/451 |
| 6,308,009 B1 * | 10/2001 | Shellenberger | ............... | F24H 9/2021 392/454 |
| 7,221,862 B1 * | 5/2007 | Miller | ............... | H05B 1/0283 392/497 |
| 7,298,968 B1 * | 11/2007 | Boros | ............... | F24H 15/174 392/494 |
| 7,773,868 B2 * | 8/2010 | Moore | ............... | F24D 19/1051 392/441 |
| 8,498,527 B2 * | 7/2013 | Roetker | ............... | F24H 15/225 392/441 |
| 8,744,252 B1 * | 6/2014 | Snyder | ............... | F24H 9/1818 392/479 |
| 8,768,154 B2 * | 7/2014 | Nakagawa | ............... | F24H 1/122 392/494 |
| 11,359,823 B2 * | 6/2022 | Zhang | ............... | F24H 15/219 |
| 11,719,466 B2 * | 8/2023 | Branecky | ............... | F24H 1/202 392/464 |
| 11,846,450 B2 * | 12/2023 | Hayden | ............... | F24H 1/0018 |
| 2003/0007790 A1 * | 1/2003 | Harris | ............... | F24H 7/0433 392/479 |
| 2010/0111508 A1 * | 5/2010 | Ding | ............... | F24H 15/219 219/494 |
| 2010/0195991 A1 * | 8/2010 | Deivasigamani | ... | F24D 17/0073 137/340 |
| 2011/0305444 A1 * | 12/2011 | Pussell | ............... | F24H 9/2028 392/471 |
| 2012/0060827 A1 * | 3/2012 | Roetker | ............... | F24H 15/345 126/714 |
| 2012/0325337 A1 * | 12/2012 | Nakagawa | ............... | F24H 1/122 137/341 |
| 2013/0034344 A1 * | 2/2013 | Lutz | ............... | F24H 15/486 392/449 |
| 2014/0202549 A1 * | 7/2014 | Hazzard | ............... | F24H 15/36 236/12.12 |
| 2015/0063793 A1 * | 3/2015 | Zeller | ............... | F24H 9/2021 392/441 |
| 2017/0122458 A1 | 5/2017 | Farris | | |

FOREIGN PATENT DOCUMENTS

| | | |
|---|---|---|
| CN | 112728774 A | 4/2021 |
| CN | 112923570 A | 6/2021 |
| CN | 116412533 A | 7/2023 |
| CN | 220892547 U | 5/2024 |

* cited by examiner

CONTROL METHOD AND APPARATUS FOR ENERGY STORAGE HEAT EXCHANGE ELECTRIC WATER HEATER

CROSS-REFERENCE TO RELATED APPLICATION(S)

The disclosure claims the priority to Chinese Patent Application No. 202411547034.2, filed with the China National Intellectual Property Administration (CNIPA) on Nov. 1, 2024, which is hereby incorporated by reference in its entirety.

FIELD

The disclosure relates to the technical field of household appliances, and in particular to a control method and apparatus for an energy storage heat exchange electric water heater.

BACKGROUND

Currently, for the energy storage heat exchange electric water heater, in order to reduce the consumption during heating by an energy storage electric heater, a flow-through electric heater is introduced into the energy storage heat exchange electric water heater to re-heat water outputted by a thermostatic valve. However, in the heating process, in order to prevent the thermostatic function from being affected by continuous water temperature increase due to the flow-through electric heater, which would result in the thermostatic valve repeatedly performing thermostatic adjustment according to different real-time readings, after the flow-through electric heater is started for heating, the thermostatic function is started after a certain time delay. But this practice increases a time required for a user from heating water to using water, i.e., increasing the user's waiting time.

SUMMARY

The disclosure provides a control method and apparatus for an energy storage heat exchange electric water heater, which is able to reduce a time required for a user from heating water to using water, i.e., shortening the user's waiting time.

Some embodiments of the disclosure provide a control method for an energy storage heat exchange electric water heater, the energy storage heat exchange electric water heater includes a water tank, an energy storage electric heater, a heat exchanger, a flow-through electric heater and a thermostatic valve; wherein the energy storage electric heater and the heat exchanger are arranged in the water tank, the flow-through electric heater and the thermostatic valve are arranged outside the water tank, and the thermostatic valve is connected to an outlet of the heat exchanger, the flow-through electric heater and a water inlet of the energy storage heat exchange electric water heater; and the control method includes:

preliminarily heating a liquid in the water tank to a first preset temperature value by using the energy storage electric heater, and maintaining the temperature;
performing heat exchange on a water in the heat exchanger by using the heated liquid in the water tank to obtain a water of the first preset temperature value;
acquiring a water flow signal value of the energy storage heat exchange electric water heater;
judging whether the water flow signal value satisfies a first preset trigger requirement;
if the water flow signal value satisfies the first preset trigger requirement, outputting the water of the first preset temperature value in the heat exchanger to the thermostatic valve;
controlling the flow-through electric heater and the thermostatic valve to be in an activated operating state at the same time, and using the thermostatic valve to mix the water of the first preset temperature value with a cold water inputted from the water inlet, to obtain a mixed water; and
heating the mixed water outputted by the thermostatic valve to a second preset temperature value by using the flow-through electric heater, wherein the second preset temperature value is greater than the first preset temperature value.

In some embodiments, in a step of judging whether the water flow signal value satisfies the first preset trigger requirement, the control method includes:
judging whether the water flow signal value is greater than a preset water flow value; and
if the water flow signal value is greater than the preset water flow value, determining that the water flow signal value satisfies the first preset trigger requirement.

In some embodiments, before controlling the flow-through electric heater and the thermostatic valve to be in the activated operating state at the same time, the control method further includes:
acquiring an outlet water temperature of the thermostatic valve;
judging whether the outlet water temperature satisfies a second preset trigger requirement; and
if the outlet water temperature satisfies the second preset trigger requirement, controlling the flow-through electric heater and the thermostatic valve to be in the activated operating state at the same time.

In some embodiments, in a step of judging whether the outlet water temperature satisfies the second preset trigger requirement, the control method includes:
acquiring a preset temperature rise value of the flow-through electric heater;
determining a temperature difference value between the second preset temperature value and the preset temperature rise value;
judging whether the outlet water temperature is greater than or equal to the temperature difference value; and
if the outlet water temperature is greater than or equal to the temperature difference value, determining that the outlet water temperature satisfies the second preset trigger requirement.

In some embodiments, in a step of judging whether the water flow signal value satisfies the first preset trigger requirement, the control method further includes:
if the water flow signal value does not satisfy the first preset trigger requirement, acquiring a water tank temperature in the energy storage heat exchange electric water heater;
judging whether the water tank temperature in the energy storage heat exchange electric water heater satisfies a third preset trigger requirement; and
if the water tank temperature in the energy storage heat exchange electric water heater satisfies the third preset trigger requirement, controlling the energy storage electric heater to be in an activated operating state.

In some embodiments, in a step of judging whether the water tank temperature in the energy storage heat exchange electric water heater satisfies the third preset trigger requirement, the control method includes:

determining a target set temperature of the energy storage heat exchange electric water heater;

judging whether the water tank temperature in the energy storage heat exchange electric water heater is less than or equal to the target set temperature; and     if the water tank temperature in the energy storage heat exchange electric water heater is less than or equal to the target set temperature, determining that the water tank temperature in the energy storage heat exchange electric water heater satisfies the third preset trigger requirement.

In some embodiments, in a step of determining the target set temperature of the energy storage heat exchange electric water heater, the control method includes:

acquiring an initial set temperature and a hysteresis temperature of the energy storage heat exchange electric water heater; and     obtaining the target set temperature of the energy storage heat exchange electric water heater on a basis of a difference value between the initial set temperature and the hysteresis temperature.

In some embodiments, in a step of judging whether the water tank temperature in the energy storage heat exchange electric water heater satisfies the third preset trigger requirement, the control method further includes:

if the water tank temperature in the energy storage heat exchange electric water heater does not satisfy the third preset trigger requirement, controlling the energy storage electric heater to be in an inactive operating state.

Some other embodiments of the disclosure provide a control apparatus for an energy storage heat exchange electric water heater, the control apparatus includes: an energy storage heat exchange electric water heater and a controller; wherein the controller is configured for executing steps of the described control method according to any one above;

the energy storage heat exchange electric water heater includes a water tank, a heat exchanger, an energy storage electric heater, a flow-through electric heater, a thermostatic valve, a water flow sensor, a first temperature sensor and a second temperature sensor;

wherein the energy storage electric heater is arranged in the water tank;

the heat exchanger and the first temperature sensor are arranged in the water tank;

the second temperature sensor is arranged between the thermostatic valve and the flow-through electric heater;

the thermostatic valve is connected to an outlet of the heat exchanger, the flow-through electric heater and a water inlet of the energy storage heat exchange electric water heater;

the flow-through electric heater is connected to a water outlet of the energy storage heat exchange electric water heater; and     an inlet of the heat exchanger is connected to the water inlet of the energy storage heat exchange electric water heater.

In some embodiments, the heat exchanger is a stainless steel heat exchange pipeline or a plate heat exchange structure.

Beneficial effects of the disclosure are: different from the related art, in the disclosure, the flow-through electric heater and the thermostatic valve are controlled to be in an activated operating state at the same time, thus the thermostatic valve is able to mix cold water with hot water outputted from the heat exchanger and then allow mixed water to flow through the flow-through electric heater for being heated. That is, the flow-through electric heater is able to directly heat the mixed water outputted from the thermostatic valve, without heating cold water in the thermostatic valve. Therefore, the temperature of water outputted after the flow-through electric heater heats the mixed water is able to reach the second preset temperature value quickly, that is, reaching the water temperature required by a user. Hence, it is helpful to reduce the time required for the user from heating water to using water, i.e., shortening the user's waiting time for using water.

BRIEF DESCRIPTION OF DRAWINGS

In order to illustrate technical solutions of embodiments of the disclosure more clearly, hereinafter, accompanying drawings requiring to be used in the illustration of the embodiments will be briefly introduced. Apparently, the accompanying drawings in the following description merely relate to some embodiments of the disclosure, and for a person of ordinary skill in the art, other accompanying drawings can also be obtained according to these accompanying drawings without involving any inventive effort. In the drawings.

DESCRIPTION OF REFERENCE SIGNS

Energy storage heat exchange electric water heater 10; Water inlet 11; Water outlet 12; Water tank 100; Heat exchanger 200; Energy storage electric heater 300; Flow-through electric heater 400; Thermostatic valve 500; Housing 700; Thermal insulation layer 800; Water flow sensor 900; First temperature sensor 101; Second temperature sensor 102.

DESCRIPTION OF EMBODIMENTS

In order to make objects, technical solutions and advantages of embodiments of the disclosure clearer, hereinafter, the technical solutions in embodiments of the disclosure will be described clearly and completely with reference to the accompanying drawings of the embodiments of the disclosure. Obviously, the embodiments as described are only some of the embodiments of the disclosure, and are not all of the embodiments of the disclosure. All other embodiments obtained by a person of ordinary skill in the art on the basis of the embodiments of the disclosure without involving any inventive effort shall all fall within the scope of protection of the disclosure.

The following disclosure provides many different embodiments or examples for implementing different structures of the disclosure. In order to simplify the disclosure content of the disclosure, specific embodiments of components and arrangements are described below. Of course, they are merely embodiments, and the purpose thereof is not intended to limit the disclosure. In addition, the disclosure may repeat reference numerals and/or letters in different embodiments. Such repetition is for the purpose of simplicity and clarity, which does not in itself indicate a relationship between the various embodiments and/or arrangements discussed.

Currently, for the energy storage heat exchange electric water heater, in order to reduce the consumption during heating by an energy storage electric heater, a flow-through electric heater is introduced into the energy storage heat exchange electric water heater to re-heat water outputted by a thermostatic valve. However, in the heating process, in order to prevent the thermostatic function from being affected by continuous water temperature increase due to the flow-through electric heater, which would result in the thermostatic valve repeatedly performing thermostatic adjustment according to different real-time readings, after the flow-through electric heater is started for heating, the thermostatic function is started after a certain time delay. But this practice increases a time required for a user from heating water to using water, i.e., increasing the user's waiting time.

Therefore, in order to solve the described technical problem, the disclosure provides a control method and apparatus for an energy storage heat exchange electric water heater, which is able to reduce the time required for a user from heating water to using water. For details, reference is able to be made to the following embodiments.

Figure 1:
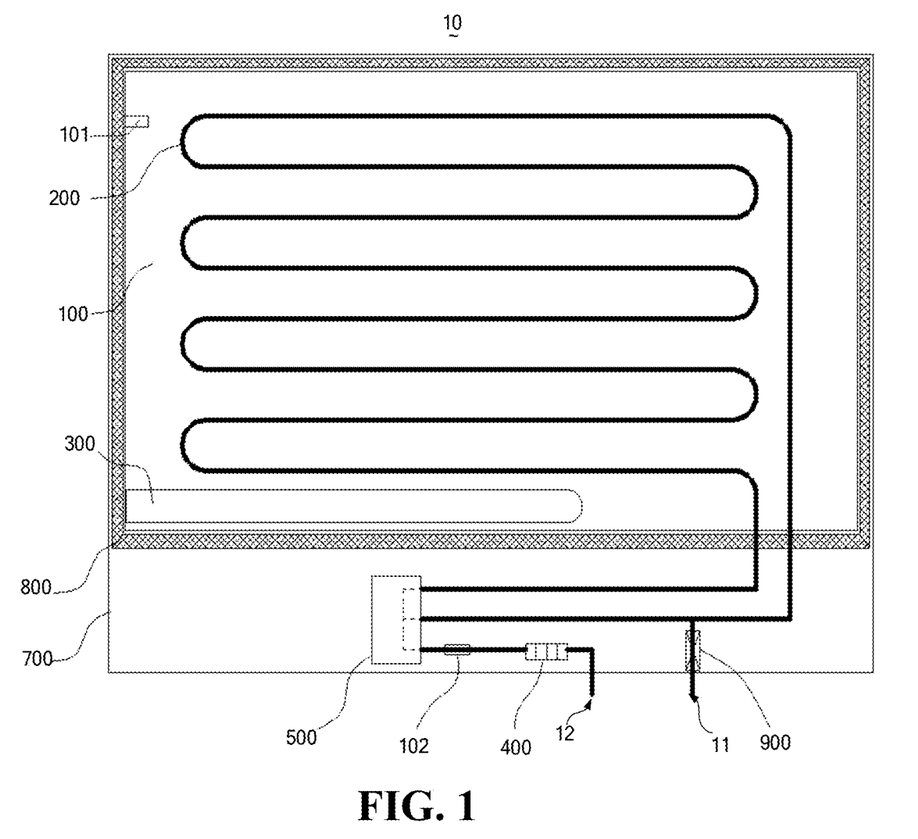
FIG. 1 is a structural schematic diagram of an energy storage heat exchange electric water heater according to an embodiment of the disclosure.

As shown in FIG. 1, the control apparatus for the energy storage heat exchange electric water heater provided in the disclosure includes an energy storage heat exchange electric water heater 10 and a controller; wherein the controller is configured for executing steps of the following method embodiments, and the energy storage heat exchange electric water heater 10 includes a water tank 100, a heat exchanger 200, an energy storage electric heater 300, a flow-through electric heater 400, a thermostatic valve 500, a water flow sensor 900, a first temperature sensor 101 and a second temperature sensor 102.

The water tank 100 is configured for accommodating an energy storage substance, and in the embodiment, the energy storage substance is water; and the energy storage and release are achieved by increase and decrease of a temperature of water. In other embodiments, the energy storage substance in the water tank 100 is also able to be oil or other substances. In some embodiments, a thermal insulation layer 800 is also arranged outside the water tank 100, and is configured for thermal insulation of energy of the water stored in the water tank 100, so as to slow down natural energy loss.

The energy storage electric heater 300 is arranged in the water tank 100, and is configured for heating water in the water tank 100, so as to store energy.

The heat exchanger 200 and the first temperature sensor 101 are arranged in the water tank 100; wherein an inlet of the heat exchanger 200 is connected to a water inlet 11 of the energy storage heat exchange electric water heater 10, and an outer wall of the heat exchanger 200 is able to be completely soaked in a water in the water tank 100 for facilitating sufficient heat exchange; a water for bathing is arranged inside the heat exchanger 200, and achieves heat exchange with the water in the water tank 100 through inner and outer walls of the heat exchanger 200, thereby achieving a purpose of raising a temperature of the water for bathing. The first temperature sensor 101 is arranged inside the water tank 100 or on an outer wall of the water tank 100, and is configured for reading a temperature of the water inside the water tank 100.

The second temperature sensor 102 is arranged between the thermostatic valve 500 and the flow-through electric heater 400, i.e., arranged at a tail end of the thermostatic valve 500 and a front end of the flow-through electric heater 400, and is configured for reading an outlet water temperature after thermostatic adjustment.

The thermostatic valve 500 is arranged outside the water tank 100 and is connected to an outlet of the heat exchanger 200 and the water inlet 11 of the energy storage heat exchange electric water heater 10, and is configured for mixing a bathing hot water outputted by the heat exchanger 200 and a cold water from a branch of the water inlet 11, so as to achieve a required water temperature.

The flow-through electric heater 400 is connected to a water outlet 12 of the energy storage heat exchange electric water heater and the tail end of the thermostatic valve 500, and is configured for secondarily heating the mixed water outputted after thermostatic adjustment by the thermostatic valve 500, so as to reach the temperature of bathing water.

In some embodiments, the water flow sensor is arranged at the water inlet 11 or the water outlet 12 of the energy storage heat exchange electric water heater, and is configured for reading a water flow entering the energy storage heat exchange electric water heater.

Specifically, in the embodiment, after flowing in from the water inlet 11 of the energy storage heat exchange electric water heater, the water flow is divided into two branches, in which a first branch of water enters the thermostatic valve 500, and a second branch of water enters the heat exchanger 200 for heat exchange, and after heat exchange, the second branch of water becomes hot and also enters the thermostatic valve 500; and cold and hot water entering the thermostatic valve 500 is mixed and then flows out, then is secondarily heated by the flow-through electric heater, and flows out from the water outlet 12 of the energy storage heat exchange electric water heater.

In the embodiment provided in the disclosure, the heat exchanger 200 is a stainless steel heat exchange pipeline, and is able to be soaked in the liquid of the water tank 100. In other embodiments, the heat exchanger 200 is also a plate structure or the like which is known in the art or is able to be implemented in the future.

In some embodiments, the energy storage electric heater 300 is arranged at a bottom of the water tank 100, so as to further increase a heating efficiency and a heat quantity of the liquid in the water tank 100, and ensure a uniformity of the temperature of the liquid.

In some embodiments, a housing 700 is arranged outside the water tank 100, and the thermal insulation layer 800 is arranged between the housing 700 and the water tank 100 for maintaining the temperature of the liquid in the water tank 100.

The thermal insulation layer 800 is made of a foaming material, EPS (polystyrene foam), a rubber and plastic foam, a vacuum heat insulation board, glass fiber cotton, etc.

Figure 2:
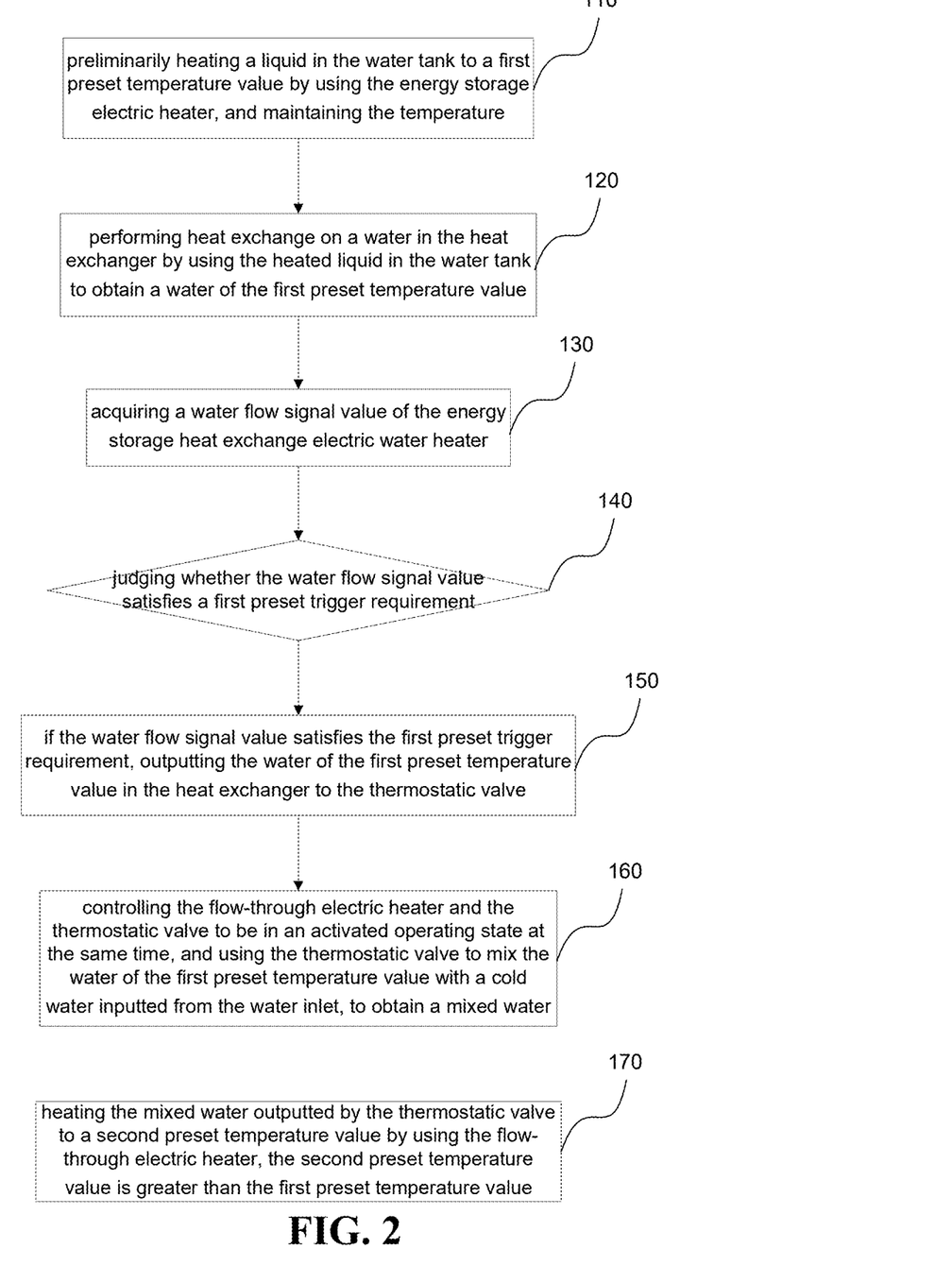
FIG. 2 is a flow diagram of a control method for an energy storage heat exchange electric water heater according to an embodiment of the disclosure.

On the basis of the energy storage heat exchange electric water heater 10 mentioned in the embodiments above, a second embodiment of the disclosure further provides a control method for the energy storage heat exchange electric water heater 10. Referring to FIG. 2, the control method includes the following steps:

Step 110: preliminarily heating a liquid in a water tank to a first preset temperature value by using an energy storage electric heater, and maintaining the temperature.

Step 120: performing heat exchange on a water in a heat exchanger by using the heated liquid in the water tank to obtain a water of the first preset temperature value.

The first preset temperature value is able to be any value in 20° C.-33° C., for example, 20° C., 25° C., 28° C., and the like.

Step 130: acquiring a water flow signal value of the energy storage heat exchange electric water heater.

Step 140: judging whether the water flow signal value satisfies a first preset trigger requirement.

Step 150: if the water flow signal value satisfies the first preset trigger requirement, outputting the water of the first preset temperature value in the heat exchanger to a thermostatic valve.

Step 160: controlling a flow-through electric heater and the thermostatic valve to be in an activated operating state at the same time, and using the thermostatic valve to mix the water of the first preset temperature value and a cold water inputted from a water inlet, to obtain a mixed water.

Step 170: heating the mixed water outputted by the thermostatic valve to a second preset temperature value by using the flow-through electric heater, wherein the second preset temperature value is greater than the first preset temperature value.

The second preset temperature value is greater than the first preset temperature value, for example, the second preset temperature value is able to be any value in a range of 35° C.-48° C., such as 38° C., 40° C., and 45° C.

The existing relevant practice is to first start the flow-through electric heater and then start the thermostatic valve after a certain time delay, such that cold water is inputted to the flow-through electric heater by the thermostatic valve within the delayed period of time; however, a temperature rise value that is able to be reached by the flow-through electric heater is generally fixed, that is to say, the temperature value of the cold water inputted by the thermostatic valve and heated by the flow-through electric heater is less than the second preset temperature value. After the thermostatic valve is started, the second preset temperature value is only able to be reached after the flow-through electric heater heats the mixed water inputted by the thermostatic valve. Therefore, the flow-through electric heater mixes the part of water of which the temperature is smaller than the second preset temperature value with the part of water of which the temperature reaches the second preset temperature value, such that the temperature of the water finally flowing out of the flow-through electric heater does not satisfy the user's requirements; and the user needs to wait for a period of time from heating water to using water, i.e., increasing the time required for the user from heating water to using water.

Therefore, in the embodiment, the flow-through electric heater and the thermostatic valve are controlled to be in an activated operating state at the same time, such that the thermostatic valve is able to mix cold water with hot water outputted from the heat exchanger and then allow mixed water to flow through the flow-through electric heater for being heated. That is, the flow-through electric heater is able to directly heat the mixed water outputted from the thermostatic valve, without heating cold water in the thermostatic valve. Therefore, the temperature of water outputted after the flow-through electric heater heats the mixed water is able to reach the second preset temperature value quickly, that is, reaching the water temperature required by a user. Hence, it is helpful to reduce the time required for the user from heating water to using water, i.e., shortening the user's waiting time for using water and temperature stabilization time.

In addition, in the embodiment, a segmented heating method is used, in which the water temperature in the electric heater is first heated to a certain lower preset value, such as the first preset temperature value, by using the energy storage electric heater in the water tank. When the user needs to use water, the electric heater is able to immediately output hot water to the thermostatic valve, and then the flow-through electric heater is used to heat the hot water again. In this way, the energy storage heat exchange electric water heater is able to start to output hot water in the early stage of heating, without the need to wait until the water temperature in the energy storage heat exchange electric water heater fully reaches a preset value, such that the electric energy consumed in the heating process is able to be converted into actually used hot water more quickly, and the waste of energy caused by the water temperature not reaching the preset value is reduced, and also the user is able to obtain required hot water in a shorter time, thereby improving the user experience.

Referring to a second embodiment of a control method for the energy storage heat exchange electric water heater provided by the disclosure, the control method includes the following steps:

Step 210: primarily heating a liquid in a water tank is primarily heated to a first preset temperature value by using an energy storage electric heater, and maintaining the temperature.

Step 220: performing heat exchange on a water in a heat exchanger by using the heated liquid in the water tank to obtain a water of the first preset temperature value.

Step 230: acquiring a water flow signal value of the energy storage heat exchange electric water heater.

Step 240: judging whether the water flow signal value is greater than a preset water flow value.

Wherein, whether the water flow signal value is greater than the preset water flow value is able to represent whether a user is in a bathing state, and the preset water flow value is in a range of 0.5 L/min-2.5 L/min.

Step 250: if the water flow signal value is greater than the preset water flow value, determining that the water flow signal value satisfies a first preset trigger requirement, then controlling the flow-through electric heater to be in an activated operating state.

Referring to a third embodiment of a control method for the energy storage heat exchange electric water heater provided by the disclosure, the control method includes the following steps:

Step 310: primarily heating a liquid in a water tank to a first preset temperature value by using an energy storage electric heater, and maintaining the temperature.

Step 320: performing heat exchange on a water in a heat exchanger by using the heated liquid in the water tank to obtain a water of the first preset temperature value.

Step 330: acquiring a water flow signal value of the energy storage heat exchange electric water heater.

Step 340: judging whether the water flow signal value satisfies a first preset trigger requirement.

Step 350: if the water flow signal value satisfies the first preset trigger requirement, outputting the water of the first preset temperature value in the heat exchanger to a thermostatic valve.

Step 360: acquiring an outlet water temperature of the thermostatic valve.

The thermostatic valve is not turned on at this time, thus the acquired outlet water temperature of the thermostatic valve is a temperature of cold water.

Step 370: judging whether the outlet water temperature satisfies a second preset trigger requirement.

In some embodiments, in a step of judging whether the outlet water temperature satisfies the second preset trigger requirement, the control method includes:

Step 371: acquiring a preset temperature rise value of a flow-through electric heater. The preset temperature rise value is a theoretical temperature rise value.

Step 372: determining a temperature difference value between the second preset temperature value and the preset temperature rise value.

Step 373: judging whether the outlet water temperature is greater than or equal to the temperature difference value.

Step 374: if the outlet water temperature is greater than or equal to the temperature difference value, determining that the outlet water temperature satisfies the second preset trigger requirement.

Step 380: if the outlet water temperature satisfies the second preset trigger requirement, controlling the flow-through electric heater and the thermostatic valve to be in an activated operating state at the same time, and using the thermostatic valve to mix the water of the first preset temperature value with a cold water inputted from a water inlet, to obtain a mixed water.

Step 390: heating the mixed water outputted by the thermostatic valve to a second preset temperature value by using the flow-through electric heater, wherein the second preset temperature value is greater than the first preset temperature value.

Referring to a fourth embodiment of a control method for the energy storage heat exchange electric water heater provided by the disclosure, the control method includes the following steps:

Step 410: primarily heating a liquid in a water tank to a first preset temperature value by using an energy storage electric heater, and maintaining the temperature.

Step 420: performing heat exchange on a water in a heat exchanger by using the heated liquid in the water tank to obtain a water of the first preset temperature value.

Step 430: acquiring a water flow signal value of the energy storage heat exchange electric water heater.

Step 440: judging whether the water flow signal value satisfies a first preset trigger requirement.

Step 450: if the water flow signal value satisfies the first preset trigger requirement, controlling the flow-through electric heater to be in an activated operating state.

Step 460: if the water flow signal value does not satisfy the first preset trigger requirement, acquiring a water tank temperature in the energy storage heat exchange electric water heater.

Step 470: judging whether the water tank temperature in the energy storage heat exchange electric water heater satisfies a third preset trigger requirement.

Step 480: if the water tank temperature in the energy storage heat exchange electric water heater satisfies the third preset trigger requirement, controlling the energy storage electric heater to be in an activated operating state.

Step 470 includes the following steps:

Step 471: determining a target set temperature of the energy storage heat exchange electric water heater.

Step 472: judging whether the water tank temperature in the energy storage heat exchange electric water heater is less than or equal to the target set temperature.

Step 473: if the water tank temperature in the energy storage heat exchange electric water heater is less than or equal to the target set temperature, determining that the water tank temperature in the energy storage heat exchange electric water heater satisfies the third preset trigger requirement.

In some embodiments, step 471, i.e., determining the target set temperature of the energy storage heat exchange electric water heater, includes:

Step 4711: acquiring an initial set temperature and a hysteresis temperature of the energy storage heat exchange electric water heater.

The initial set temperature T1S is generally set to 55° C.-85° C., and the hysteresis temperature TO is generally set to 5° C.-10° C.

Step 4712: obtaining the target set temperature of the energy storage heat exchange electric water heater on a basis of a difference value between the initial set temperature and the hysteresis temperature.

That is, the target set temperature=a difference value obtained by the initial set temperature $T_{1S}$-the hysteresis temperature $T_0$.

Referring to a fifth embodiment of a control method for the energy storage heat exchange electric water heater provided by the disclosure, the control method includes the following steps:

Step 510: primarily heating a liquid in a water tank to a first preset temperature value by using an energy storage electric heater, and maintaining the temperature.

Step 520: performing heat exchange on a water in a heat exchanger by using the heated liquid in the water tank to obtain a water of the first preset temperature value.

Step 530: acquiring a water flow signal value of the energy storage heat exchange electric water heater.

Step 540: judging whether the water flow signal value satisfies a first preset trigger requirement.

Step 550: if the water flow signal value satisfies the first preset trigger requirement, controlling a flow-through electric heater to be in an activated operating state.

Step 560: if the water flow signal value does not satisfy the first preset trigger requirement, acquiring a water tank temperature in the energy storage heat exchange electric water heater.

Step 570: judging whether the water tank temperature in the energy storage heat exchange electric water heater satisfies a third preset trigger requirement.

Step 580: if the water tank temperature in the energy storage heat exchange electric water heater satisfies the third preset trigger requirement, controlling the energy storage electric heater to be in an activated operating state.

Step 590: if the water tank temperature in the energy storage heat exchange electric water heater does not satisfy the third preset trigger requirement, controlling the energy storage electric heater to be in an inactive operating state.

Figure 3:
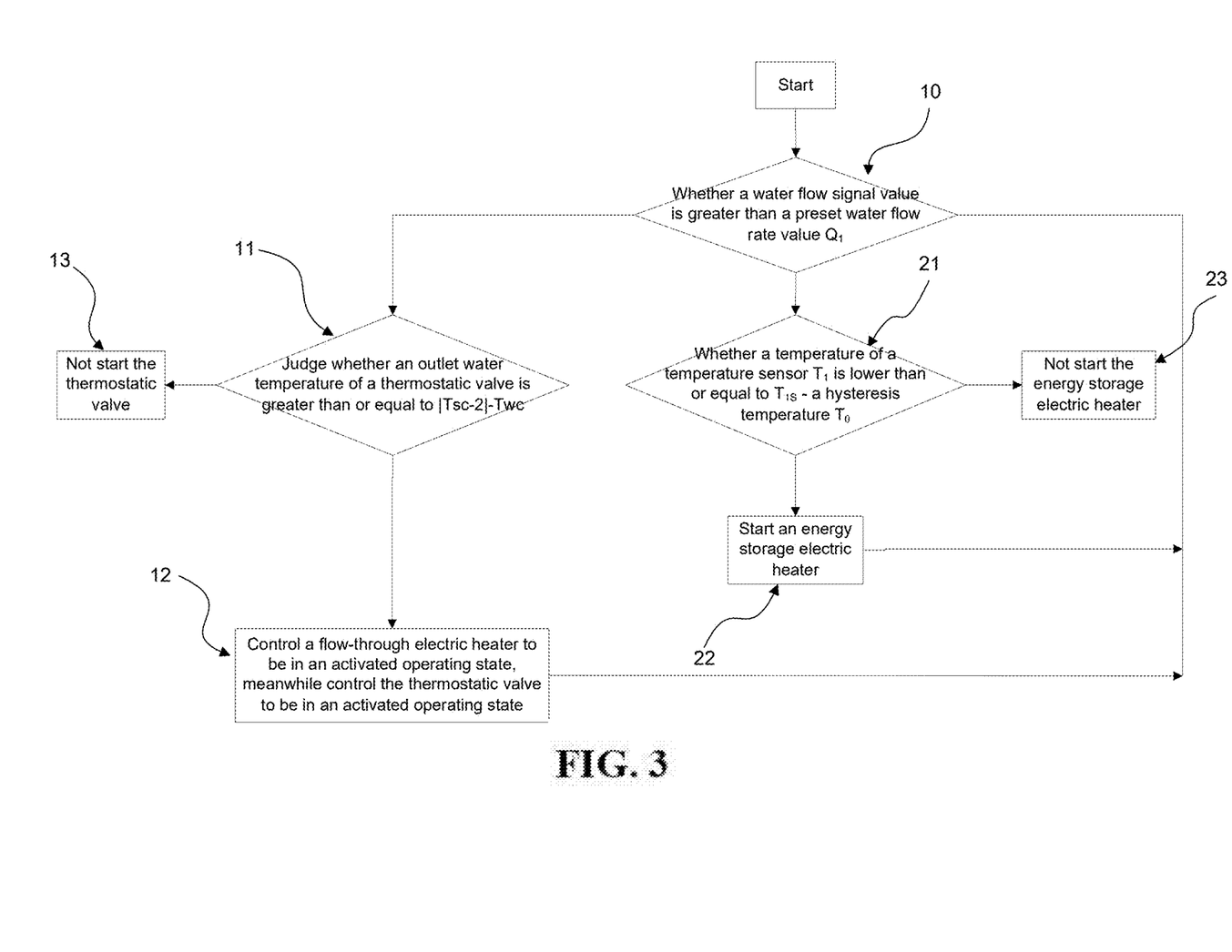
FIG. 3 is a flow diagram of a control method for an energy storage heat exchange electric water heater according to another embodiment of the disclosure.

On the basis of the described embodiments, as shown in FIG. 3, the control method for the energy storage heat exchange electric water heater provided by the disclosure mainly includes the following steps:

Step 10: judging whether a water flow signal value is greater than a preset water flow value $Q_1$.

If so, executing step 11; and if not, executing step 21.

Step 11: judging whether an outlet water temperature of a thermostatic valve is greater than or equal to |Tsc−2|−Twc.

That is, judging whether the outlet water temperature is greater than or equal to the temperature difference value, wherein |Tsc−2| is a range of a second preset temperature value, i.e., a preset temperature of a water outlet, Twc is a preset temperature rise value of a flow-through electric heater, and |Tsc−2|−Twc is the temperature difference value.

If so, executing step 12; and if not, executing step 13.

Step 12: controlling the flow-through electric heater to be in an activated operating state, and meanwhile controlling the thermostatic valve to be in an activated operating state.

Step 13: not starting the thermostatic valve.

Step 21: judging whether a temperature of a temperature sensor $T_1$ is lower than or equal to $T_{1S}$–the hysteresis temperature $T_0$.

$T_{1S}$ is an initial set temperature, and $T_{1S}$–the hysteresis temperature $T_0$ is a target set temperature, that is, judging whether the temperature of the temperature sensor $T_1$ is less than or equal to the target set temperature; if so, executing step 22, and if not, executing step 23.

Step 22: starting an energy storage electric heater.

Step 23: not starting the energy storage electric heater.

After the thermostatic valve is started in step 13 and the energy storage electric heater is started in step 22, the process returns to step 10.

With regard to step 10 to step 23, that is to say, when a user needs to use water, a water flow sensor reads a water flow signal value $>Q_1$, which represents that the user is in a bathing state; at this time, the flow-through electric heater and the thermostatic valve are turned on at the same time, and the flow-through electric heater starts to heat mixed water outputted by the thermostatic valve.

A temperature sensor $T_3$ is arranged between the tail end of the thermostatic valve and the flow-through electric heater, and is configured for reading an outlet water temperature after the thermostatic valve has performed thermostatic adjustment, thus "a temperature of a water outlet of the water heater"= "a temperature at a location of the temperature sensor $T_3$"+ "a temperature rise value generated by the flow-through electric heater".

The temperature rise value generated by the flow-through electric heater is able to be pre-calculated, and specifically, the following formula 1 may be used:

$$P*t*\eta = C*M*T_{WC}, \qquad \text{formula 1.}$$

wherein P*t represents the generated electric energy; C*M*Twc represents a temperature energy variation caused by temperature rise generated by the electric energy; η represents the power conversion efficiency, and is generally 92%-99%; P represents the power of the flow-through electric heater, and a conventional value thereof is 3000 W-5500 W; t represents the unit time, which is able to be understood here as 1 minute; C represents the specific heat capacity of water, $4.2 \times 10^3$ J/(kg.° C.); M represents the mass of water flowing through the flow-through electric heater per unit time, which is equivalent to the water flow and is able to be read by a water flow sensor at a water inlet; and Twc represents the temperature rise value that is able to be generated by the flow-through electric heater.

The thermostatic valve is arranged between the flow-through electric heater and the heat exchanger, such that the thermostatic valve mixes hot water outputted by the heat exchanger and cold water inputted from the water inlet, and mixed water flows through the flow-through electric heater after thermostatic adjustment, which is able to improve the stability of the water temperature inputted into the flow-through electric heater, thus, after being heated by the flow-through electric heater, a stable water temperature is able to be outputted and provided to a user for use.

When the user does not use water, that is, when the water flow sensor reads a water flow signal value $\leq Q_1$, if the water tank temperature does not reach the target set temperature (i.e., the value read by the temperature sensor $T_1$ of the water tank <the set temperature $T_{1S}$–the hysteresis temperature $T_0$), the energy storage electric heater is started to heat the liquid in the water tank for energy storage.

The device embodiments as described above are merely specific embodiments. The units described as separate components may or may not be physically separated, and the components displayed as units may or may not be physical units, that is, may be located in one place, or may be distributed to multiple network units. Some or all of the modules may be selected according to actual needs to achieve the purpose of the solutions of the embodiments.

It should be understood that the terms used herein are for the purpose of describing particular exemplary embodiments only and are not intended for limiting. As used herein, the singular forms "a" "an" and "the" may also be intended to include the plural forms as well, unless the context clearly indicates otherwise. The terms "comprising" "including" "containing" and "having" are inclusive and therefore specify the presence of stated features, steps, operations, elements, and/or components, but do not preclude the presence or addition of one or more other features, steps, operations, elements, components, and/or combinations thereof.

The content above merely relates to specific embodiments of the disclosure, such that a person skilled in the art can understand or implement the disclosure. Multiple modifications to these embodiments will be readily apparent to a person skilled in the art, and the general principles defined herein may be implemented in other embodiments without departing from the spirit or scope of the disclosure. Accordingly, the disclosure is not limited to these embodiments shown herein, but complies with the widest scope consistent with the principles and novel features applied herein.

The invention claimed is:

1. A control method for an energy storage heat exchange electric water heater, wherein the energy storage heat exchange electric water heater comprises a water tank, an energy storage electric heater, a heat exchanger, a flow-through electric heater and a thermostatic valve; the energy storage electric heater and the heat exchanger are arranged in the water tank, the flow-through electric heater and the thermostatic valve are arranged outside the water tank, and the thermostatic valve is connected to an outlet of the heat exchanger, the flow-through electric heater and a water inlet of the energy storage heat exchange electric water heater; and the control method comprises:

preliminarily heating a liquid in the water tank to a first preset temperature value by using the energy storage electric heater, and maintaining the temperature;

performing heat exchange on a water in the heat exchanger by using the heated liquid in the water tank to obtain a water of the first preset temperature value;

acquiring a water flow signal value of the energy storage heat exchange electric water heater;

judging whether the water flow signal value satisfies a first preset trigger requirement;

if the water flow signal value satisfies the first preset trigger requirement, outputting the water of the first preset temperature value in the heat exchanger to the thermostatic valve;

controlling the flow-through electric heater and the thermostatic valve to be in an activated operating state at the same time, and using the thermostatic valve to mix the water of the first preset temperature value with a cold water inputted from the water inlet, to obtain a mixed water; and heating the mixed water outputted by the thermostatic valve to a second preset temperature value by using the flow-through electric heater, the second preset temperature value is greater than the first preset temperature value;

before controlling the flow-through electric heater and the thermostatic valve to be in the activated operating state at the same time, the control method further comprises:

acquiring an outlet water temperature of the thermostatic valve;

judging whether the outlet water temperature satisfies a second preset trigger requirement; and if the outlet water temperature satisfies the second preset trigger requirement, controlling the flow-through electric heater and the thermostatic valve to be in the activated operating state at the same time;

in a step of judging whether the outlet water temperature satisfies the second preset trigger requirement, the control method comprises:

acquiring a preset temperature rise value of the flow-through electric heater;

determining a temperature difference value between the second preset temperature value and the preset temperature rise value;

judging whether the outlet water temperature is greater than or equal to the temperature difference value; and if the outlet water temperature is greater than or equal to the temperature difference value, determining that the outlet water temperature satisfies the second preset trigger requirement.

2. The control method for an energy storage heat exchange electric water heater according to claim 1, wherein in a step of judging whether the water flow signal value satisfies the first preset trigger requirement, the control method comprises:

judging whether the water flow signal value is greater than a preset water flow value; and if the water flow signal value is greater than the preset water flow value, determining that the water flow signal value satisfies the first preset trigger requirement.

3. The control method for an energy storage heat exchange electric water heater according to claim 1, wherein in a step of judging whether the water flow signal value satisfies the first preset trigger requirement, the control method further comprises:

if the water flow signal value does not satisfy the first preset trigger requirement, acquiring a water tank temperature in the energy storage heat exchange electric water heater;

judging whether the water tank temperature in the energy storage heat exchange electric water heater satisfies a third preset trigger requirement; and if the water tank temperature in the energy storage heat exchange electric water heater satisfies the third preset trigger requirement, controlling the energy storage electric heater to be in an activated operating state.

4. The control method for an energy storage heat exchange electric water heater according to claim 3, wherein in a step of judging whether the water tank temperature in the energy storage heat exchange electric water heater satisfies the third preset trigger requirement, the control method comprises:

determining a target set temperature of the energy storage heat exchange electric water heater;

judging whether the water tank temperature in the energy storage heat exchange electric water heater is less than or equal to the target set temperature; and if the water tank temperature in the energy storage heat exchange electric water heater is less than or equal to the target set temperature, determining that the water tank temperature in the energy storage heat exchange electric water heater satisfies the third preset trigger requirement.

5. The control method for an energy storage heat exchange electric water heater according to claim 4, wherein in a step of determining the target set temperature of the energy storage heat exchange electric water heater, the control method comprises:

acquiring an initial set temperature and a hysteresis temperature of the energy storage heat exchange electric water heater; and obtaining the target set temperature of the energy storage heat exchange electric water heater on a basis of a difference value between the initial set temperature and the hysteresis temperature.

6. The control method for an energy storage heat exchange electric water heater according to claim 3, wherein in a step of judging whether the water tank temperature in the energy storage heat exchange electric water heater satisfies the third preset trigger requirement, the control method further comprises:

if the water tank temperature in the energy storage heat exchange electric water heater does not satisfy the third preset trigger requirement, controlling the energy storage electric heater to be in an inactive operating state.

7. A control apparatus for an energy storage heat exchange electric water heater, wherein the control apparatus comprises: an energy storage heat exchange electric water heater and a controller; the controller is configured for executing steps of the control method according to claim 1;

the energy storage heat exchange electric water heater comprises a water tank, a heat exchanger, an energy storage electric heater, a flow-through electric heater, a thermostatic valve, a water flow sensor, a first temperature sensor and a second temperature sensor;

the energy storage electric heater is arranged in the water tank;

the heat exchanger and the first temperature sensor are arranged in the water tank;

the second temperature sensor is arranged between the thermostatic valve and the flow-through electric heater;

the thermostatic valve is connected to an outlet of the heat exchanger, the flow-through electric heater and a water inlet of the energy storage heat exchange electric water heater;

the flow-through electric heater is connected to a water outlet of the energy storage heat exchange electric water heater; and an inlet of the heat exchanger is connected to the water inlet of the energy storage heat exchange electric water heater.

8. The control apparatus for an energy storage heat exchange electric water heater according to claim 7, wherein the heat exchanger is a stainless steel heat exchange pipeline or a plate heat exchange structure.

* * * * *